United States Patent [19]

Nguyen Phuoc et al.

[11] Patent Number: 5,644,205
[45] Date of Patent: Jul. 1, 1997

[54] ASYNCHRONOUS MOTOR POWER SUPPLY CONTROL SYSTEM

[75] Inventors: Vinh T. Nguyen Phuoc, Boulogne; Hubert Cornilleau, Verneuil sur Seine; Antonio Almeida, Tournan en Brie; Lucien Perrin, Paris, all of France

[73] Assignee: Schneider Electric S.A., Boulogne-Billancourt, France

[21] Appl. No.: 357,755

[22] Filed: Dec. 16, 1994

[30] Foreign Application Priority Data

Dec. 16, 1993 [FR] France .................... 93 15274

[51] Int. Cl.$^6$ .................................................... H02P 5/34
[52] U.S. Cl. ................... 318/801; 318/254; 318/138; 318/439; 318/798; 318/799; 318/800; 318/801; 318/802; 318/803; 318/804; 318/805; 318/806; 318/807; 318/808; 318/809; 318/810; 318/811; 318/812; 318/813; 318/814; 318/815
[58] Field of Search .................... 318/798–815, 318/254, 439, 138; 363/55, 67, 56, 123, 131, 132, 136, 58

[56] References Cited

U.S. PATENT DOCUMENTS

| | | | |
|---|---|---|---|
| 5,136,228 | 8/1992 | Yamada et al. | 318/808 |
| 5,184,057 | 2/1993 | Sakai et al. | 318/803 |
| 5,272,429 | 12/1993 | Lipo et al. | 318/808 |
| 5,285,145 | 2/1994 | Minowa et al. | 318/808 |
| 5,298,848 | 3/1994 | Ueda et al. | 318/811 |
| 5,378,976 | 1/1995 | Inaji et al. | 318/810 |
| 5,426,357 | 6/1995 | Satou | 318/811 |
| 5,448,150 | 9/1995 | Yamamoto et al. | 318/805 |

FOREIGN PATENT DOCUMENTS

| | | |
|---|---|---|
| 0 165 020 | 12/1985 | European Pat. Off. . |
| 0 177 114 | 4/1986 | European Pat. Off. . |

OTHER PUBLICATIONS

Patent Abstracts of Japan, vol. 7, No. 243, (E–207); 28 Oct. 1983; Maeda Takeo Power Source for Driving AC Motor.

Patent Abstracts of Japan, vol. 8, No. 131, (E–251); 19 Jun. 1984; Kazuhito Nakahara Step–Out Preventing System for AC Motor.

Patent Abstracts of Japan, vol. 6, No. 226; (E–141); 11 Nov. 1982; Hatsutori Motonobu, et al. Controlling Method and Device for AC Motor.

Journal De Physique, vol. 3, No. 6; Jun. 1993, pp. 1123 – 1133; T. Ourth; Commande Vectorielle D'un Moteur Asynchrone Sans Capteur.

Primary Examiner—Karen Masih
Attorney, Agent, or Firm—Oblon, Spivak, McClelland, Maier & Neustadt, P.C.

[57] ABSTRACT

An asynchronous motor is supplied with power from an AC line voltage via a variable speed drive including a rectifier bridge connected to the AC line voltage, a DC voltage intermediate circuit including a capacitor and an inverter including switches and connected to the phase windings of the motor. A system for controlling the power supply to the motor includes a device for controlled resumption of motor speed after supply of power to the motor is interrupted.

6 Claims, 4 Drawing Sheets

FIG. 4A
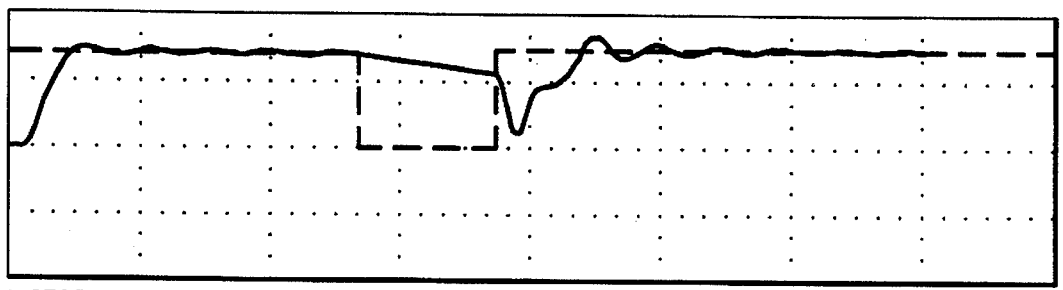
MOTOR SPEED
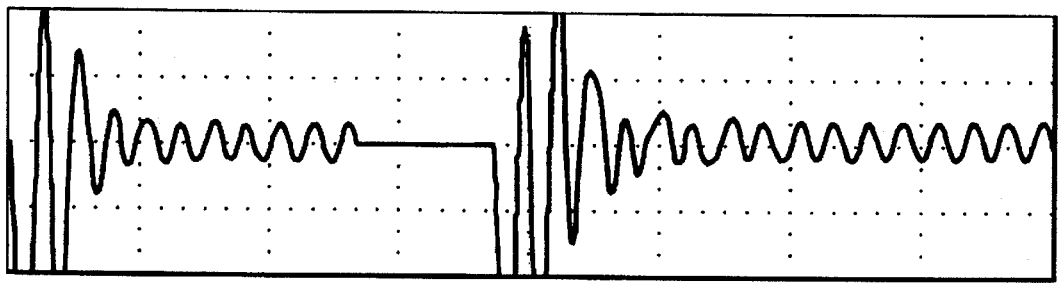
LINE CURRENT
FIG. 4B
FIG. 5A
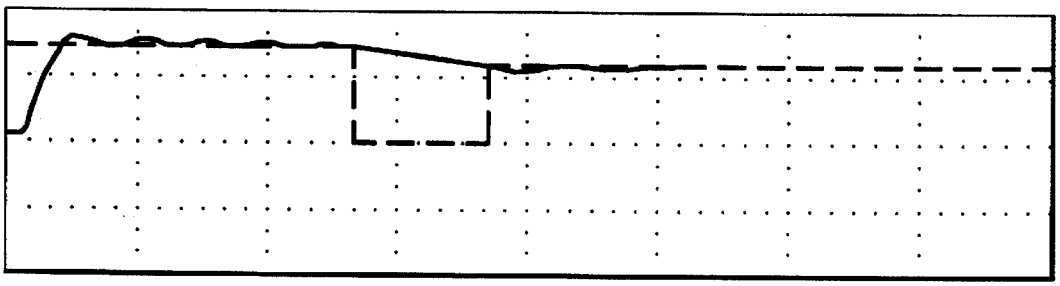
MOTOR SPEED
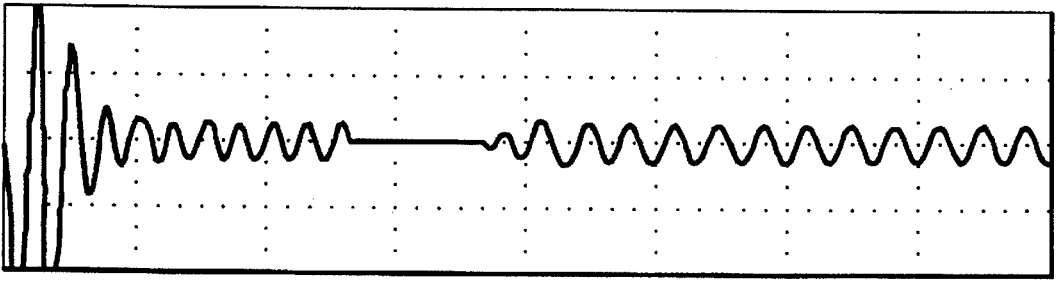
LINE CURRENT
FIG. 5B

ASYNCHRONOUS MOTOR POWER SUPPLY CONTROL SYSTEM

BACKGROUND OF THE INVENTION

1. Field of the Invention

The present invention concerns an asynchronous motor power supply control system.

2. Description of the Prior Art

Asynchronous motors are usually supplied with power from an AC line voltage via a variable speed drive. The variable speed drive is a frequency converter including a rectifier bridge connected to the AC line voltage, a DC voltage intermediate circuit including a capacitor and an inverter including solid-state switches controlled by a pulse modulation device and connected to the phase windings of the motor.

When the supply of power to the motor is cut off the motor can be allowed to "free wheel". This retains control of the control device.

However, unless specific precautions are taken, resuming control of the motor speed "on the fly" can cause high current surges and momentary loss of speed. The current surges can damage the switches in the inverter.

Consequently, an object of the invention is to provide a system enabling resumption of motor speed control after cutting off the supply of power to the motor without causing current surges.

It is therefore necessary to determine the electrical speed ω and to set the angular position of the voltage vector relative to the motor flux at the time the power supply returns. The voltage vector is a mathematical representation of the resultant of the actual voltages applied to the motor and the electrical speed is the product of the mechanical speed of the motor by the number of poles.

The object as stated is achieved by means for controlled resumption of motor speed control such as an identification structure which estimates the electrical speed of the motor and sets the angular position of the voltage vector in a rotating orthogonal system of axes (d, q) in which the (d) axis corresponds to the motor flux.

The identification structure advantageously includes a structure for estimating the speed based on an angle calculation unit which determines the angular position of the voltage vector by calculating its angle α to an orthogonal system of axes (α, β) which is fixed relative to the motor stator and a differentiator unit which differentiates the angle α.

The angle calculation unit determines the coordinates $V_\alpha$ and $V_\beta$ of the voltage vector in the fixed system of axes (α, β) to deduce therefrom the angle α.

A positioning unit sets the angular position of the voltage vector in phase quadrature to the estimated motor flux.

The means for controlled resumption of motor speed control also include a device for progressively augmenting the component $V_q$ of the voltage up to a control value subject to a time constant which is dependent on the rotor time constant.

The system can include a cascade regulation structure for limiting the current if the evolution of the estimated voltage towards the control voltage of the motor is faster than the rotor time constant.

The following description with reference to the drawings will highlight the features and advantages of one specific embodiment of the invention.

BRIEF DESCRIPTION OF THE DRAWINGS

FIG. 4 simulates uncontrolled on the fly resumption of motor speed control.

FIG. 5 simulates controlled on the fly resumption of motor speed control.

DETAILED DESCRIPTION OF THE PREFERRED EMBODIMENT

The system is associated with a three-phase asynchronous motor M.

The initial electrical speed $\omega_{ref}$ of the motor is supplied by a ramp generator. The ramp generator receives as input a set point speed $\omega_{cons}$ set by the user.

The motor is supplied with power from an AC line voltage via a frequency converter type variable speed drive.

Figure 1:
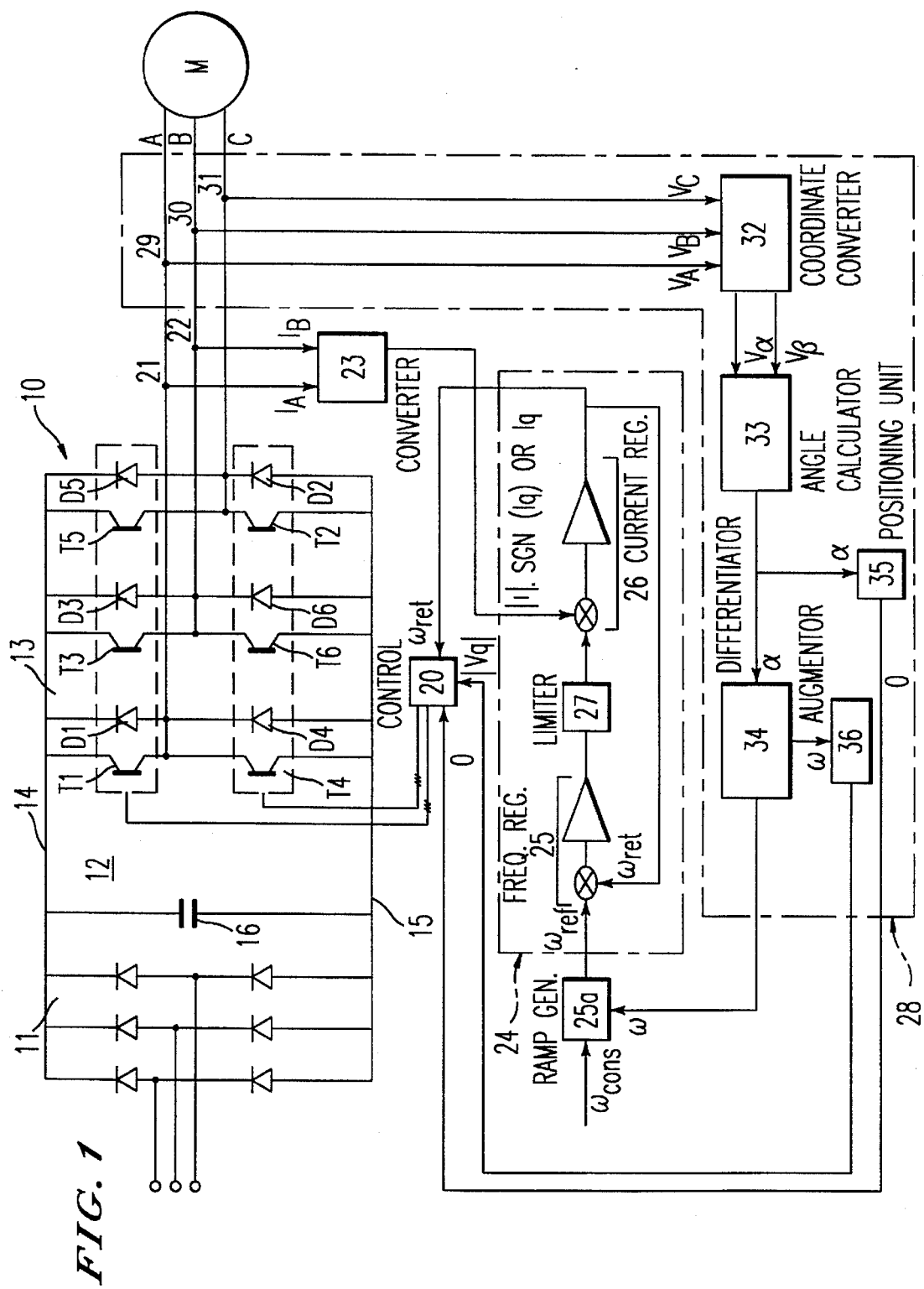
FIG. 1 is a block diagram of the system of the invention.

The solid state frequency converter 10 shown in FIG. 1 is connected to the three-phase (or possibly single-phase) AC line voltage. The converter is of the voltage wave type and includes a three-phase rectifier bridge 11, a DC voltage intermediate circuit 12 and an inverter 13.

The rectifier bridge 11 has six diodes connected to the three phases of the AC line voltage and its output delivers a DC voltage to the intermediate circuit 12.

The intermediate circuit includes high-path and low-path conductors 14, 15 between which is disposed a filter capacitor 16.

The input of the inverter 13 is connected to the conductors 14 and 15. Its output is connected to the phase conductors A, B, C of the asynchronous motor M.

The inverter includes three pairs of solid-state switches T1-T6 shunted by respective recovery diodes D1-D6. Each pair of switches comprises two cascaded switches T1, T4; T3, T6; T5, T2 of which one switch (T1, T3, T5) is a high-path switch and the other (T4, T6, T2) is a low-path switch. The mid-point of each pair is connected to a respective phase winding of the motor. A control circuit 20 turns the switches T1 through T6 on and off at chosen times.

Current sensors 21 and 22 are provided on the phase conductors A and B. They deliver current signals $I_A$ and $I_B$ in a fixed three-phase system of axes (A, B, C) corresponding to the phase windings A, B and C to generate the missing current signal $I_C$.

A coordinator converter unit 23 converts the current signals $I_A$, $I_B$ and $I_C$ into a current signal $I_q$, the component of the current in a rotating system of axes (d, q) and representing the motor torque. The system of axes (d, q) rotates at the synchronous speed, the d axis corresponding to the motor flux and the q axis leading the d axis by π/2. The unit 23 outputs either the current $I_q$ or the modulus |I| and the sign sgn($I_q$) of the current $I_q$.

The system also includes a cascade regulation structure 24. This structure includes a frequency regulator 25 and a current regulator 26.

Each regulator normally comprises an amplifier PI.

The frequency regulator 25 receives the frequency $\omega_{ref}$ from a ramp generator 25a and as feedback the return frequency $\omega_{ret}$, estimated motor speed, delivered by the current regulator 26.

The current regulator 26 receives a current reference voltage generated at the output of the frequency regulator, this current representing the current required in the motor, and as feedback the current signal supplied by the unit 23. The output of the current regulator drives the control circuit 20 of the inverter.

The current reference voltage can be peak limited by a limiter 27. This protects the motor.

Finally, the system includes an identification structure 28 which has voltage sensing units 29, 30, 31, a coordinate converter unit 32, an angle calculator unit 33, a differentiator unit 34 and a positioning unit 35.

The voltage sensing units 29, 30 and 31 are voltage sensors on the phase conductors A, B and C. They deliver sensed voltages $V_A$, $V_B$ and $V_C$ in the fixed system of axes (A, B, C) and components of the voltage vector.

Figure 2:
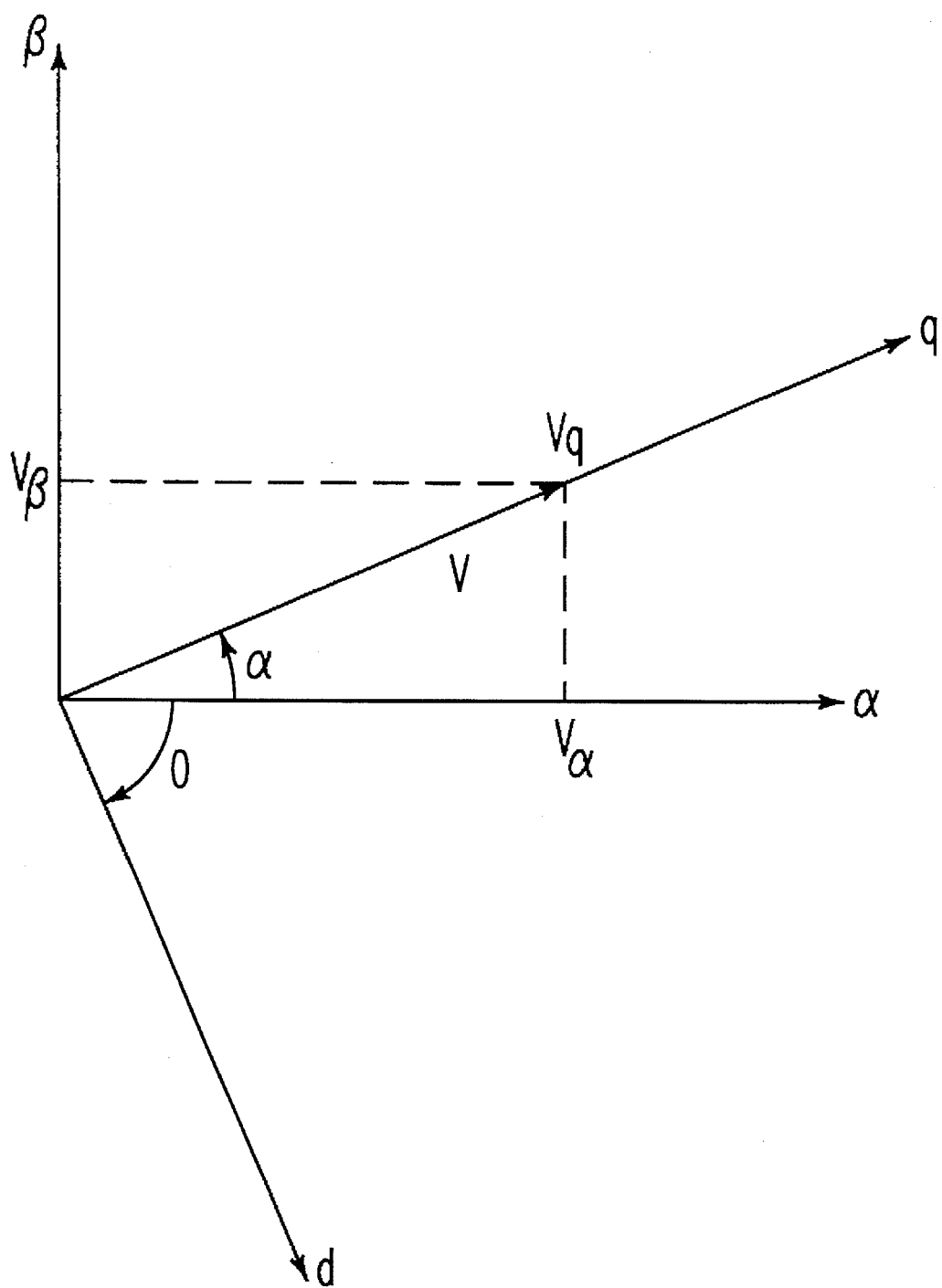
FIG. 2 shows a voltage vector in a fixed system of axes (α, β).

The coordinate converter unit 32 converts the voltages $V_A$, $V_B$ and $V_C$ into voltages $V_\alpha$ and $V_\beta$ in a fixed two-axis system of axes ($\alpha$, $\beta$). The system of axes ($\alpha$, $\beta$), shown in FIG. 2, is defined by two perpendicular axes ($\alpha$, $\beta$), ($\alpha$) being the axis supporting the phase A winding of the motor and ($\beta$) leading the axis ($\alpha$) by $\pi/2$.

From the coordinates $V_\alpha$ and $V_\beta$ of the voltage vector, the calculator unit 33 determines the angular position of the voltage vector in the fixed system of axes ($\alpha$, $\beta$). The angle $\alpha$ of the voltage vector to the ($\alpha$) axis is generally defined by:

$$\alpha = ATN\left(\frac{V\beta}{V\alpha}\right)$$

The calculator unit 33 includes a calculator element which determines the value x equal to $V\beta/V\beta$ and a table which defines the function ATN (x). It delivers the angle $\alpha$ corresponding to the calculated value x.

Finally, the differentiator unit 34 estimates the electrical speed $\omega$ of the motor as $$\omega = \frac{d\alpha}{dt}.$$

Figure 3:
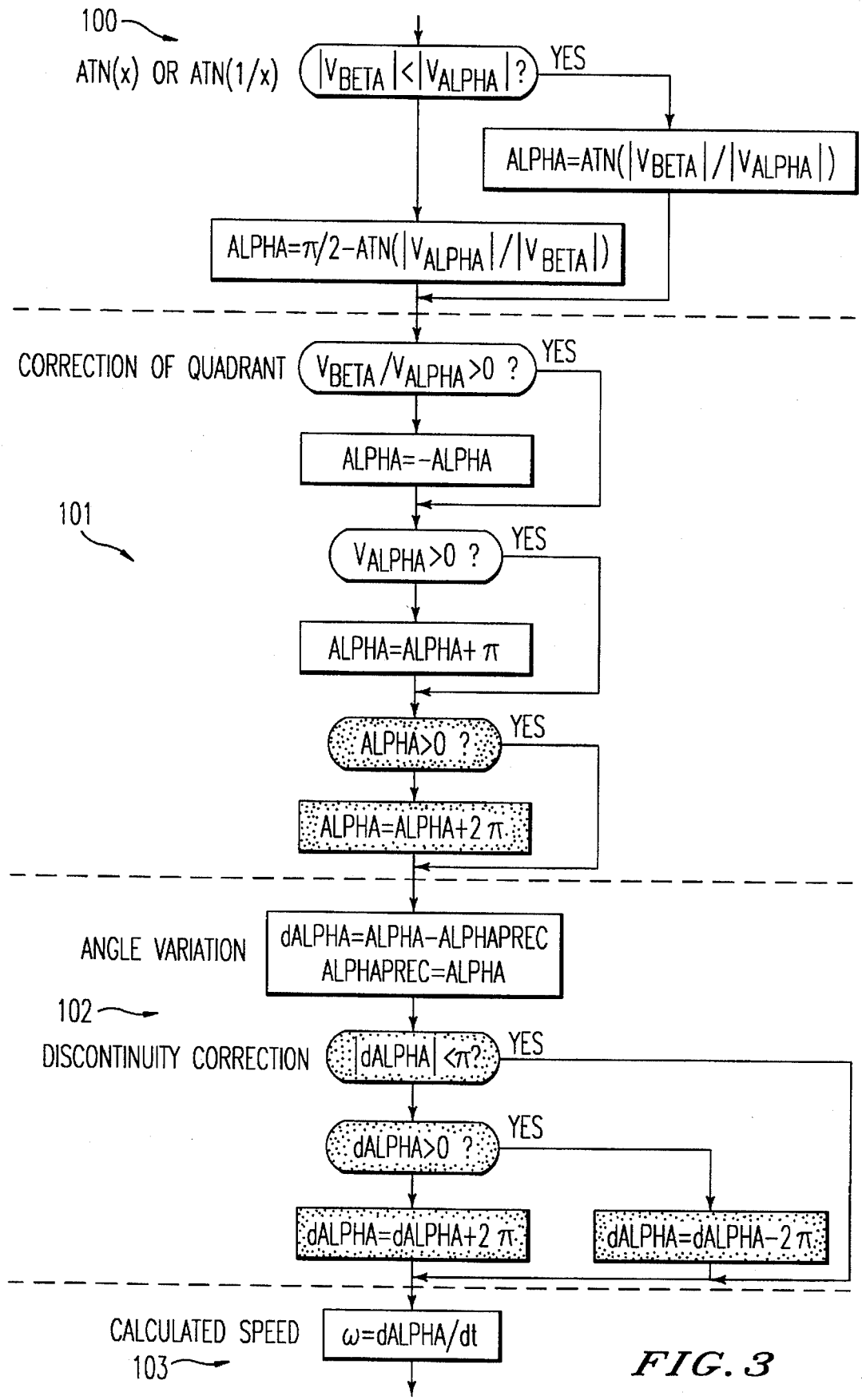
FIG. 3 shows the algorithm for estimating the electrical speed ω of the motor as a function of the angular position of the voltage vector in the system of axes (α, β)

The operations effected by the units 33 and 34 are shown in more detail in FIG. 3.

Step 100 defines the equation of the angle $\beta$ dependent on the value of the modulus of x. The function ATN (x) is defined by a table of values for x varying from 0 to 1 only, and consequently:

if the modulus of x is less than 1, the equation used is $$\alpha = ATN\left(\left|\frac{V\beta}{V\alpha}\right|\right);$$

if the modulus of x is greater than 1, the equation used is $$\alpha = \frac{\pi}{2} - ATN\left(\left|\frac{V\alpha}{V\beta}\right|\right).$$

Step 101 shows that it is also necessary to allow for the sign of $V_\alpha$ and $V_\beta$. The voltage vector can be in any quadrant of the system of axes ($\alpha$, $\beta$) and the vector must be moved into the first quadrant so that the angle $\alpha$ is between 0 and $\pi/4$.

Accordingly, the angle $\alpha$ calculated in step 100 may need to be corrected:

if $v_\beta/v_\alpha > 0$ and $V_\alpha > 0$, the angle $\alpha$ is positive, and it therefore is unchanged;

if $v_\beta/v_\alpha > 0$ and $V_\alpha < 0$, $\pi$ must be added to the angle $\alpha$ and the angle obtained is positive;

if $v_\beta/v_\alpha < 0$ it is necessary to use the opposite of the angle $\alpha$, and if $V_\alpha > 0$, the angle obtained being negative, it is necessary to add $2\pi$ to return to the defined interval [0,2$\pi$];

if $v_\beta/v_\alpha < 0$ it is necessary to use the opposite of the angle $\alpha$, and if $V_\alpha < 0$, it is necessary to add $\pi$.

Step 102 calculates the variation in the angle $\alpha$ between two samplings. This variation must not exceed a particular value (for example $\pi$); if it does, it is necessary to subtract $\pm 2\pi$ depending on the sign of the variation to eliminate any discontinuity from 0 to $2\pi$.

If the angle $\alpha$ is coded by a 16-bit number such that $2^{16}$ represents $2\pi$, for example, the $\pm 2\pi$ operations just mentioned are not needed. They are shown shaded in the algorithm for this reason.

Step 103 calculates the electrical speed of the motor as a function of the angle variation calculated in step 102 and the time elapsed between two samplings.

Finally, the positioning unit 35, knowing the angle $\alpha$, sets the angular position of the voltage vector in the system of axes (d, q) so that it is carried by the (q) axis, initializing the (d) axis corresponding to the motor flux relative to the ($\alpha$) axis at an angle $\theta$ such that $\theta = \alpha - \pi/2$ if the speed $\omega$ is positive (FIG. 2) and $\theta = \alpha + \pi/2$ if the speed $\omega$ is negative. The component of the voltage vector on the q axis is denoted $V_q$.

The operation of the device will now be described.

In the embodiment of the invention described, resumption of motor speed control on the fly is effected after interruption of the AC line voltage. The interruption has been long enough for control of the motor to have been lost. Consequently, the motor has been allowed to free wheel.

When the AC line voltage returns, if the device of the invention were not used high current surges would occur as soon as the speed began to increase (FIG. 4). There are no current surges if the device of the invention is used, however (FIG. 5).

When the AC line voltage returns it is necessary to know the electrical speed $\omega$ of the motor. This speed is therefore estimated (every 255 µs, for example) as soon as the AC line voltage is interrupted.

The voltage sensors deliver the voltage on each motor phase A, B and C. The unit 32 converts the coordinates $V_A$, $V_B$ and $V_C$ into coordinates $V_\alpha$ and $V_\beta$ in the system of axes ($\alpha$, $\beta$).

The unit 33 calculates the angle $\alpha$ and the differentiator unit 34 delivers the electrical speed of the motor to the ramp generator 25a so that it can reinitialize the reference speed $\omega_{ref}$.

The unit 35 sets the angular position of the voltage vector in the system of axes (d, q) so that it is carried by the q axis.

Thus when the AC line voltage returns the voltage applied is equal (in modulus and in phase) to the voltage developed by the motor. This prevents any current surges.

The means 28 for controlled resumption of motor speed control also include a device 36 to progressively augment the component $V_q$ of the voltage up to a control value subject to a time constant which is dependent on the rotor time constant.

There is no current surge if this occurs more slowly than the rotor time constant.

Otherwise the current is limited by the cascade regulation structure 24.

It is to be understood that variants of and improvements to details of the embodiments of the invention described can be made without departing from the scope of the invention.

There is claimed:

1. System for controlling the supply of power to an asynchronous motor from an AC line voltage via a variable speed drive including a rectifier bridge connected to the AC line voltage, a DC voltage intermediate circuit including a capacitor, an inverter comprising switches and connected to the phase windings of the motor and an inverter control for controlling said switches, the system including means for controlled resumption of motor speed control after interruption of the AC line voltage connected to said inverter control comprising an identification structure for estimating an electric speed $\omega$ of the motor and for setting an angular position of the voltage vector in a rotating orthogonal system of axes (d, q) in which the axis (d) corresponds to a motor flux and the axis (q) leads (d) by $\pi/2$.

2. System according to claim 1 wherein said identification structure includes a structure for estimating the speed $\omega$ comprising an angle calculator unit to determine the angular position of the voltage vector by calculating its angle $\alpha$ to an orthogonal system of axes ($\alpha$, $\beta$) fixed relative to the motor stator and a differentiator unit which differentiates the angle $\alpha$.

3. System according to claim 2 wherein said angle calculator unit determines said angle $\alpha$ by calculating $\frac{V_\beta}{V_\alpha}$ where $V_\alpha$ and $V_\beta$ are the coordinates of the voltage vector V in the system of axes ($\alpha$, $\beta$) and using a table of values which define a function $ATN(\frac{V_\beta}{V_\alpha})$.

4. System according to claim 1 wherein said identification structure includes a unit for setting the angular position of said voltage vector in said system of axes (d, g) so that said voltage vector is carried by said axis (g), initializing said axis (d) relative to said axis ($\alpha$) at an angle $\theta$ such that $\theta = \alpha - \frac{\pi}{2}$ or $\theta = \alpha + \frac{\pi}{2}$ depending on the sign of the motor speed.

5. System according to claim 1 wherein said means for controlled resumption of motor speed control include a device to augment progressively the voltage component $V_q$ in said system of axes (d, g) to a control value subject to a time constant dependent on 9 rotor time constant.

6. System according to claim 1, including a cascade regulation structure for limiting current.

* * * * *